United States Patent
Kudva et al.

(10) Patent No.: US 11,748,640 B2
(45) Date of Patent: Sep. 5, 2023

(54) HIERARCHICAL TOURNAMENT-BASED MACHINE LEARNING PREDICTIONS

(71) Applicant: o9 Solutions, Inc., Dallas, TX (US)

(72) Inventors: Gautham K. Kudva, Flower Mound, TX (US); Srinath goud Vanga, San Jose, CA (US); Koustuv Chatterjee, Gilbert, AZ (US)

(73) Assignee: o9 Solutions, Inc., Dallas, TX (US)

( * ) Notice: Subject to any disclaimer, the term of this patent is extended or adjusted under 35 U.S.C. 154(b) by 0 days.

(21) Appl. No.: 17/979,479

(22) Filed: Nov. 2, 2022

(65) Prior Publication Data
US 2023/0109711 A1 Apr. 13, 2023

Related U.S. Application Data

(63) Continuation of application No. 17/449,350, filed on Sep. 29, 2021, now abandoned.

(51) Int. Cl.
*G06N 5/04* (2023.01)
*G06N 5/022* (2023.01)

(52) U.S. Cl.
CPC .............. *G06N 5/04* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 10,296,848 B1* | 5/2019 | Mars | G06N 20/20 |
| 11,386,325 B1* | 7/2022 | Srinivasan | G06N 3/045 |
| 2021/0150330 A1* | 5/2021 | Sharma | G06N 3/08 |
| 2022/0383322 A1* | 12/2022 | Butvinik | G06Q 20/4016 |

* cited by examiner

*Primary Examiner* — Daniel T Pellett
(74) *Attorney, Agent, or Firm* — Schwegman Lundberg & Woessner, P.A.

(57) ABSTRACT

Systems and techniques for hierarchical tournament-based machine learning predictions are described herein. A machine learning selection model may be trained with training data. A configuration may be received that includes the metric and a target prediction. A set of evaluation component combinations may be selected using the machine learning selection model. Each evaluation component combination of the set of evaluation component combinations may include an algorithm, a hierarchical learning model corresponding to a level of a hierarchy, and a prediction model for the target prediction. The set of evaluation component combinations may be transmitted to a cluster of computing nodes. Output results may be received for the set of evaluation component combinations. The output results may be evaluated using the metric to determine a winning evaluation component combination. The winning evaluation component combination may be stored in storage for use in calculating future predictions for the target prediction.

21 Claims, 7 Drawing Sheets

HIERARCHICAL TOURNAMENT-BASED MACHINE LEARNING PREDICTIONS

CLAIM OF PRIORITY

This application is a continuation of U.S. patent application Ser. No. 17/449,350, filed Sep. 29, 2021, which is incorporated by reference herein in its entirety.

TECHNICAL FIELD

Embodiments described herein generally relate to machine learning predictions and, in some embodiments, more specifically to hierarchical tournament-based machine learning predictions.

BACKGROUND

Machine learning may be used to make predictions based on evaluation of data. A graph network may include a data structure that is hierarchical. Evaluation of data in a hierarchical data structure may completed by evaluating data at differing levels of the hierarchy to establish a prediction. A prediction may provide an indication of a likely outcome based on the state of the data in the data structure.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Prediction problems are often multidimensional and each dimension often consists of hierarchies, such as stock keeping units (SKUs) belonging to products which in turn can be grouped into categories. It is unknown upfront whether, for a given dataset, the most accurate forecasts may be arrived at if machine learning models are built at a SKU level (e.g., one model for each SKU), at a product level (e.g., one model for each product), or at a category level (e.g., one model for each category). It is also unknown whether the highest forecast accuracy is achieved by executing the model at the SKU level, product level, or category level. The same may be simultaneously present in other dimensions such as at a store level, etc.

The combinations of forecast levels, model levels, and possible choices of algorithm are too numerous (e.g., combinatorial) to be able to be arrived by humans directly. To address this issue, hierarchical tournaments are executed over a set of computational nodes known as a cluster. A processor receives input from the configuration interface on the dimensions and hierarchies to be considered for the purposes of determining the best combination of algorithm, model level, and prediction level that generates the best quality of forecast.

Jobs are executed on the cluster that simulates the tournament. A global level model is built and multiple algorithms are used to evaluate each model and prediction accuracy is measured to pick a winning algorithm. Models are created at multiple levels and predicted. In this stage of the tournament, the model level is determined by having multiple model levels compete against each other and the winner is selected via similar prediction accuracy measurement. Multiple forecast levels are evaluated with the winning algorithm and the winning model level preset. Forecasts are generated at multiple hierarchical levels and the data is spread down to the desired level where applicable. The winner is measured by similar prediction accuracy calculation. A conclusion of the best choice of prediction level, model level, and algorithm and generates the prediction with minimum error is derived. The information is encapsulated in a reusable recipe that may be subsequently invoked to generate predictions.

Figure 1:
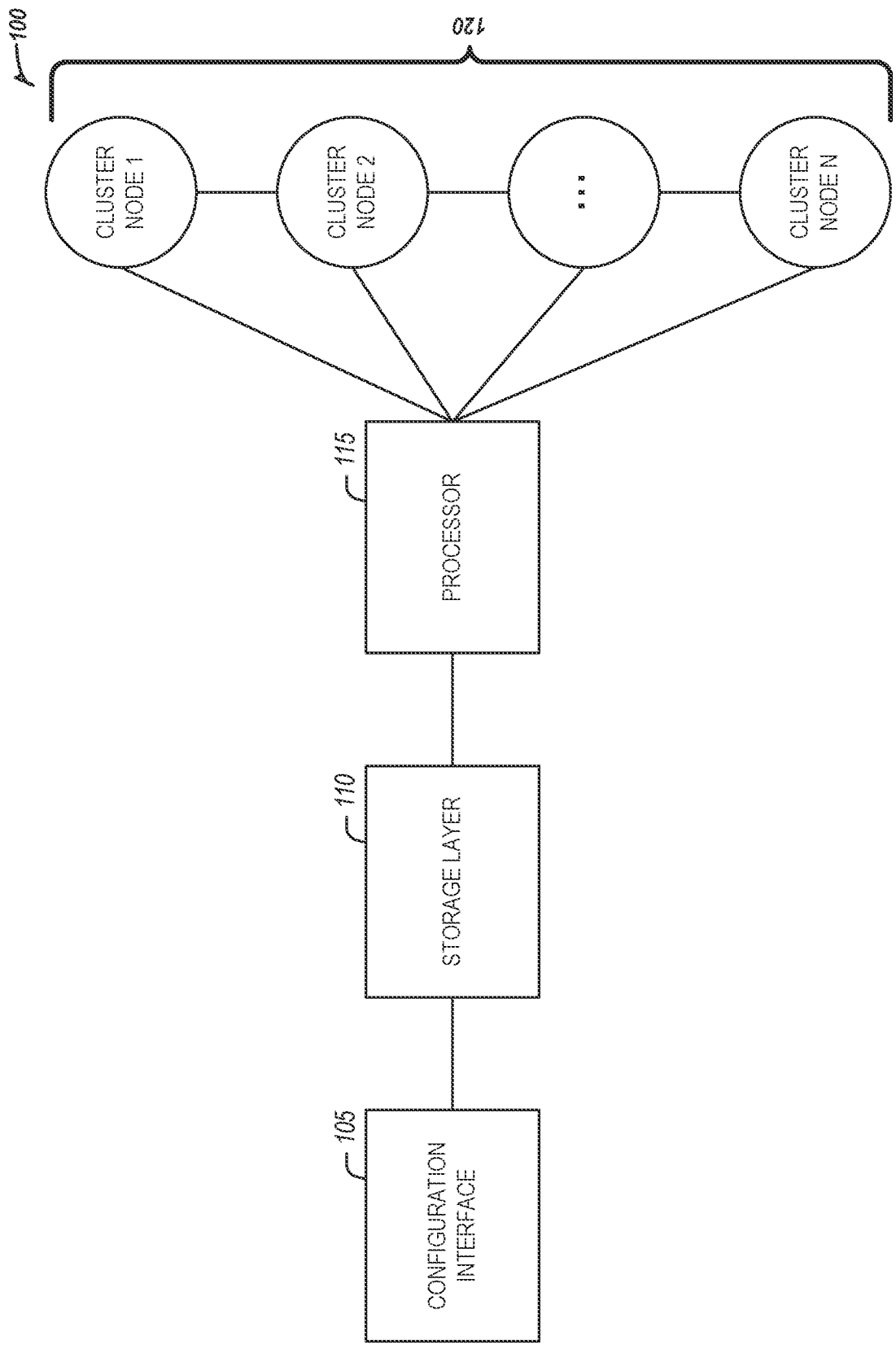
FIG. 1 illustrates a block diagram of an example of a system for hierarchical tournament-based machine learning predictions, according to an embodiment.

FIG. 1 is a block diagram of an example of a system 100 for hierarchical tournament-based machine learning predictions, according to an embodiment. The system 100 may include a configuration interface 105, a storage layer 110, and a processor 115 that executes jobs over a cluster 120, that executes hierarchical tournaments in order to come up with the best predictions given historical data and other features.

Figure 2A:
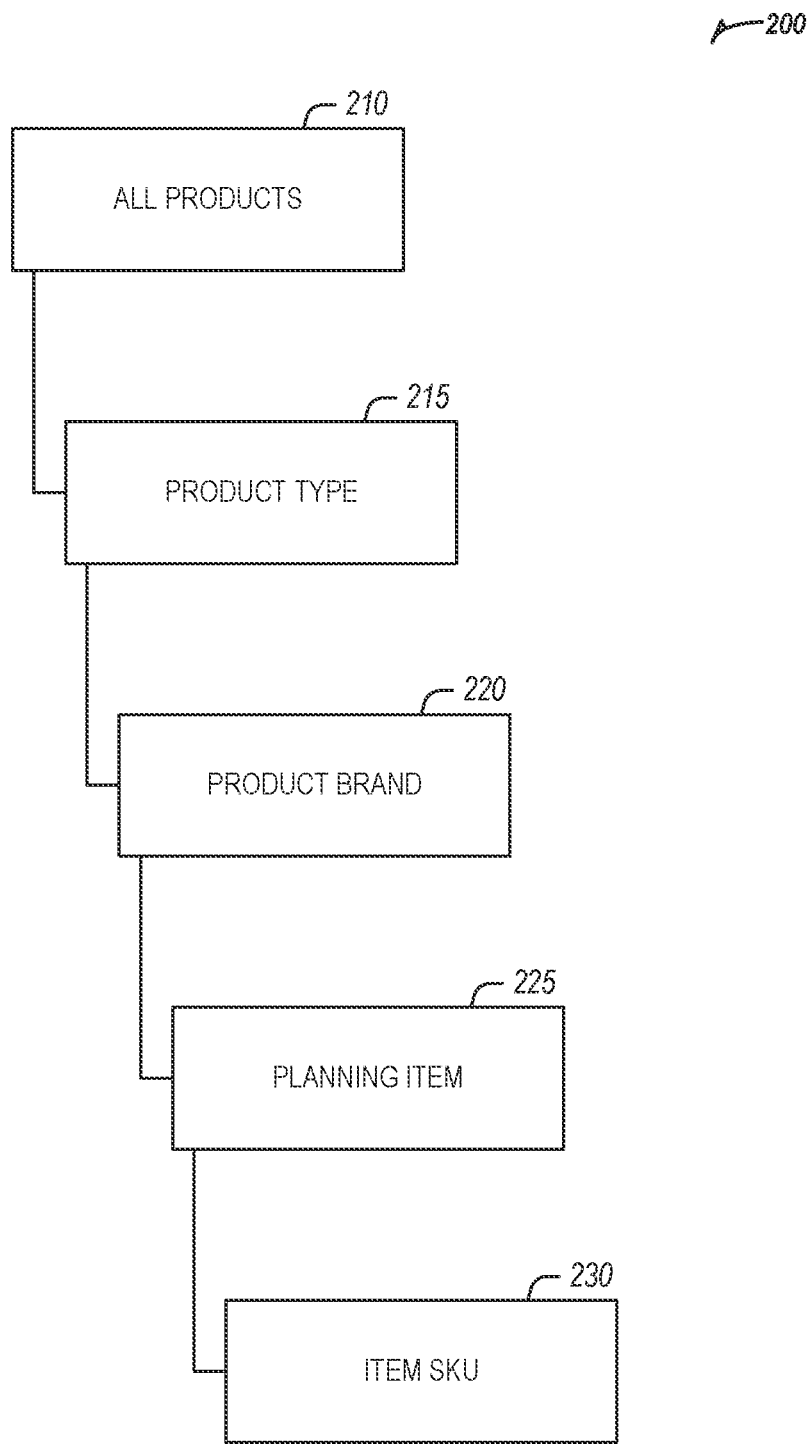
FIG. 2A illustrates a block diagram of an example of a product hierarchy for hierarchical tournament-based machine learning predictions, according to an embodiment.

The configuration interface 105 may receive dimensions and hierarchies to be considered for the purposes of determining the best combination of algorithm, model level, and prediction level that generates the best quality of forecast. FIG. 2A illustrates a block diagram of an example of a product hierarchy 200 for hierarchical tournament-based machine learning predictions, according to an embodiment. The product hierarchy 200 includes a number of levels including all products 210, product type 215, product brand 220, planning item 225, and item SKU 230. The levels of the product hierarchy 200 classify products according to attributes of a given product. For example, a product may be classified as belonging to brand ACME at the product brand level 220 if it includes an ACME brand attribute in its configuration data.

The products may be described in a graph cube network including nodes and edges that describe relationships between the products and a supply chain of a logistics system. The nodes may represent stores, products, manufacturers, manufacturing facilities, warehouses, and the like. The edges may define relationships between the nodes, for example, a relationship between a store and a warehouse, a relationship between a manufacturing facility and a component supplier, etc.

Figure 2B:
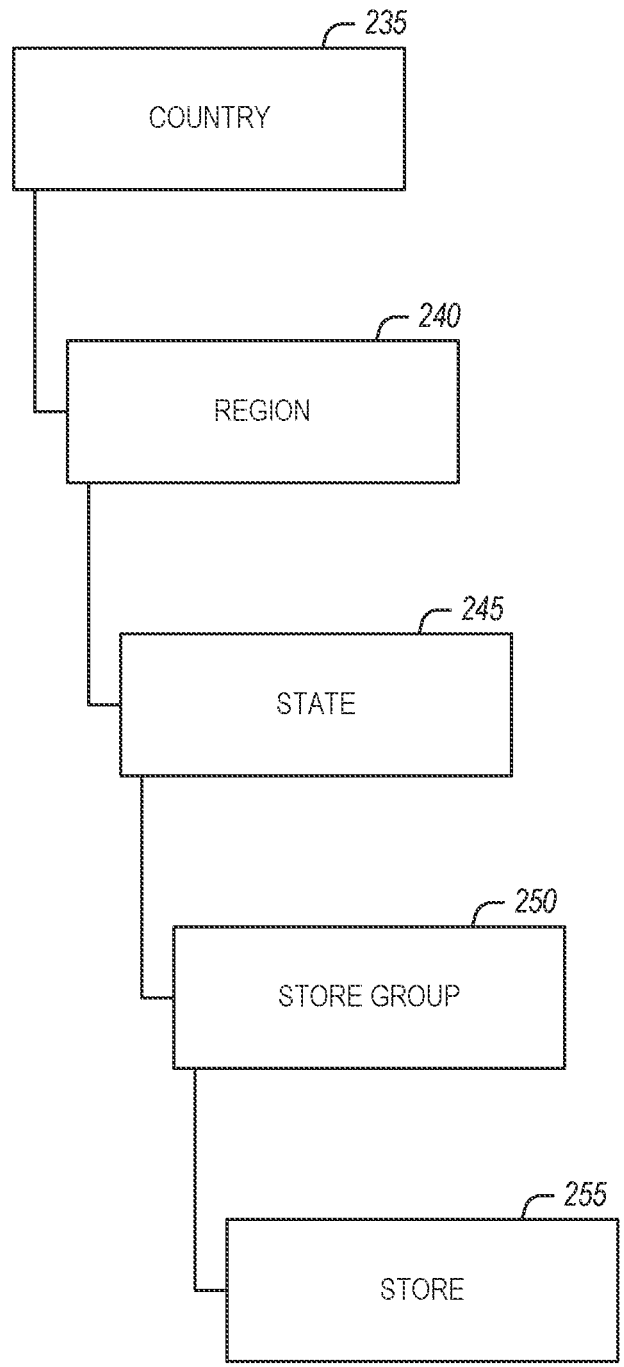
FIG. 2B illustrates a block diagram of an example of a geographical hierarchy for hierarchical tournament-based machine learning predictions, according to an embodiment.

FIG. 2B illustrates a block diagram of an example of a geographical hierarchy 205 for hierarchical tournament-based machine learning predictions, according to an embodiment. The geographical hierarchy 205 may include a variety of levels such as country 235, region 240, state 245, store group 250, and store 255. The levels of the geographical hierarchy 205 classify nodes or other data included in the graph cube network based on geographical attributes. For example, a supply of a widget may be destined for a specific store as indicated at the store 255 level based on a destination attribute of the supply. The store may be part of a Widget Co. store group as indicated at the store group level based on a store group attribute of the store. Likewise, the supply and the store may be classified at the country 235, region 24, and state 245 levels based of corresponding attributes inherent to their node. In an example, the attributes may be derived based on the edges of the graph cube network and attributes of other nodes sharing an edge in the graph cube network. For example, the supply may be destined for the Widget Co. store and the country 235, the region 240, the state 245, and the store group 250 of the supply may be derived from the relationship between the supply and the Widget Co. store indicated by a shared edge between the supply and the Widget Co. store using the Widget Co. store attributes.

Figure 3:
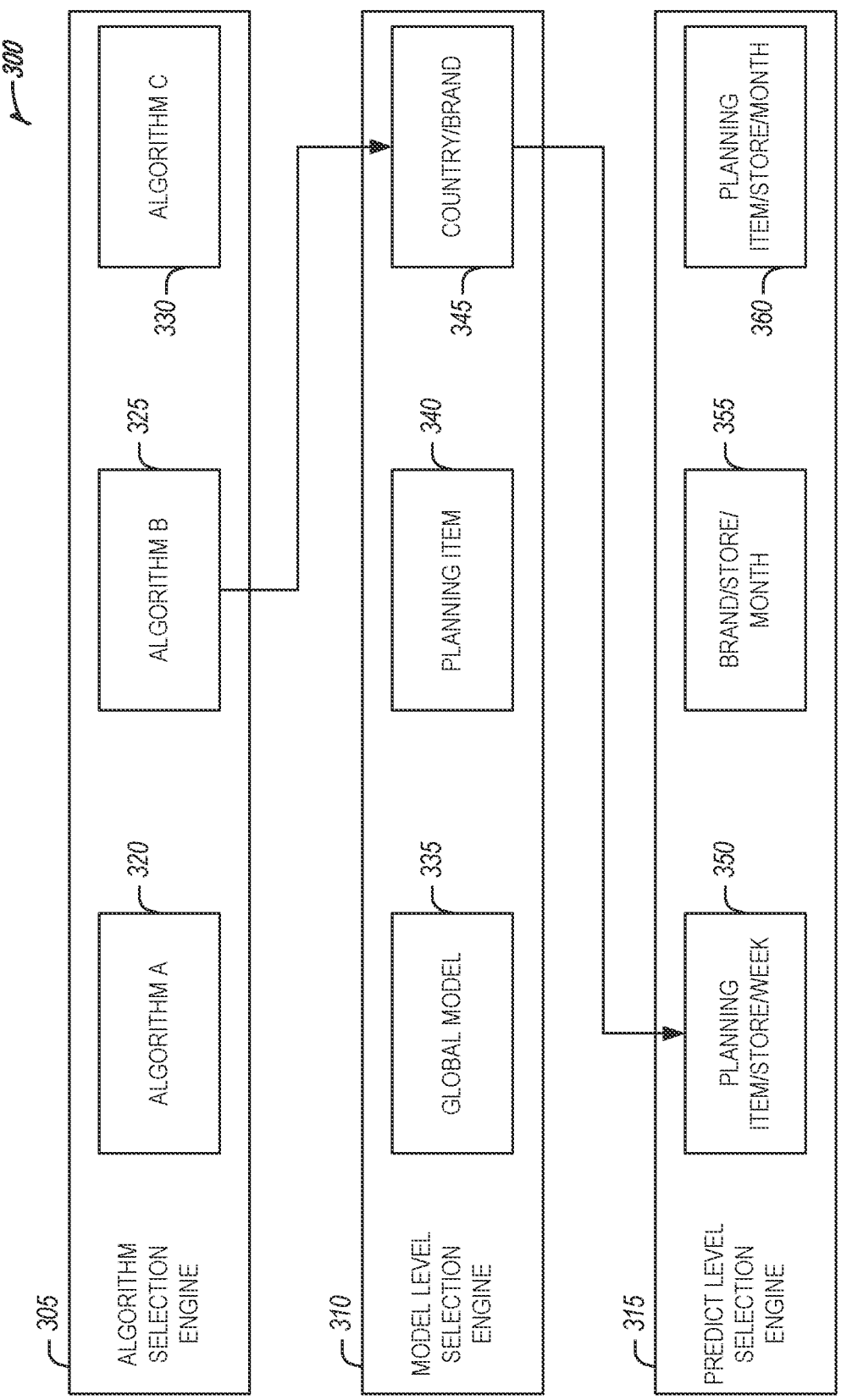
FIG. 3 illustrates a block diagram of an example of a tournament hierarchy for hierarchical tournament-based machine learning predictions, according to an embodiment.

FIG. 3 illustrates a block diagram of an example of a tournament hierarchy 300 for hierarchical tournament-based machine learning predictions, according to an embodiment. A tournament, as used herein, refers to a selection routine in which a variety of algorithm, model, and prediction combinations complete against each other to determine a winning combination (e.g., the combination with the highest accuracy, highest precision, etc.). An algorithm selection engine 305 selects an algorithm for inclusion in a combination from a set of algorithms such as algorithm A 320, algorithm B 325, algorithm C 330, etc. A model level selection engine 310 may select a model for inclusion in a combination from a set of models such as a global model 335, a planning item model 340, a country/brand model 345, etc. A prediction level selection engine 315 may select a prediction for inclusion in a combination for a set of predictions such as planning items/store/week 350, brand/store/month 355, planning item/store/month 360, etc.

The algorithms (e.g., algorithm A 320, algorithm B 325, algorithm C 330, etc.) may include different techniques (e.g., mathematical functions, order of operations, attribute selection, etc.) for performing calculations at a model level and prediction level. The calculations may lead to differing prediction results that may then be compared to determine a tournament winner. The models (e.g., the global model 335, the planning item model 340, the country/brand model 345, etc.) may be machine learning models defined (e.g., trained using training data, configured neural network models, etc.) at hierarchical levels of a hierarchy such as the product hierarchy 205 as described in FIG. 2A, the geographical hierarchy 310 as described in FIG. 2B, etc. The model may define inputs (e.g., attributes, etc.) to be used in evaluating data within the graph cube network. For example, a model may define stock level status such as a duration of time a product in in stock or out of stock at a corresponding level such as the store level 255 as described in FIG. 2B.

The predict levels (e.g., planning items/store/week 350, brand/store/month 355, planning item/store/month 360, etc.) may define the prediction output of the model to be calculated using a selected algorithm and model. For example, the planning items/store/week 350 prediction may request output of a prediction calculation result indicating a number of planning items for a store in a given week indicated by a time period.

Returning to the description of FIG. 1, the configuration interface 105 may accept a time window for which predictions are to be calculated, a segment of the graph cube network to be evaluated, a hierarchy, nodes, edges, or other data that defines the dimensions or bounds of the evaluation. The dimensions are used by the combinations of algorithms, models, and predictions that are used to perform the various prediction calculations that will compete in the tournament.

The storage layer 110 includes data from the graph cube network that describes the activity occurring among the nodes and edges of the graph cube network. For example, the data may include movement of goods throughout a supply chain of the graph cube network, movement of components between manufacturers and suppliers, etc. The storage layer 110 may be a large unstructured data warehouse that relies on big data storage techniques. The storage layer 110 provides the input data for the processor 115.

The processor 115 may be an artificial intelligence or machine learning processor that executes the algorithm selection engine 305, the model level selection engine 310, and the predict level selection engine 315 to select combinations of algorithms, models, and predictions to enter in the tournament. For example, the processor may select the algorithm B 325, the country/brand model 345, and the planning items/store/week 350 prediction as a combination to enter in the tournament. Additional combinations may include the planning items/store/week 350 and variations of the algorithm A 320, the algorithm C 320, the global model 335, the planning item model 340, and the country/brand model 345.

The selections may be based on a prediction by the processor 115 that indicates how likely a combination is to output a result within a threshold of accuracy, precision, or other metric to be achieved by the prediction. In an example, the processor 115 may use a machine learning model that has been trained to identify or classify a set of combinations as likely competitors in the tournament. The models may have been trained or may have learned based on previously conducted tournaments or based on labeled data indicating successful competitors in prior tournaments. The processor 115 generates a cluster 120 of nodes for executing the combinations to calculate their corresponding predictions. The cluster may execute the predictions in parallel to reduce processing time for making calculations or may queue the nodes to reduce resource consumption based on resources available during execution of the combinations.

The processor 115 receives the prediction output of the cluster 120 and evaluates the output to select a winner. Based on the configuration data received by the configuration interface 105, the processor 115 evaluates the predictions calculated by each combination to select the combination that provides the most correct result for the given metric (e.g., accuracy, precision, time to return, etc.) or set of metric provided. For example, the algorithm B 325, the country/brand model 345, and the planning items/store/week 350 prediction combination may have tied with another combination based on accuracy of prediction result, but may be selected as the winner because the combination arrived at the result in a shorter period of time resulting in lower computing resource consumption. The processor 115 may include a baseline prediction result for a given prediction and may evaluate the competitors using the baseline to identify performance of the competitor for a given metric. In an example, the processor 115 may use a classifier to evaluate the results amongst each other to rank the competitors automatically without having a predetermined baseline of the prediction.

The processor 115 may store the winner in the storage layer 110 for sue in calculating a future prediction. The processor 115 may periodically reconduct the tournament to validate that the winning combination remains the best combination for meeting the defined metrics. If the winner does not win a subsequent tournament, the storage layer 110 is updated with the current winner and will be used in subsequent prediction calculations.

Figure 4:
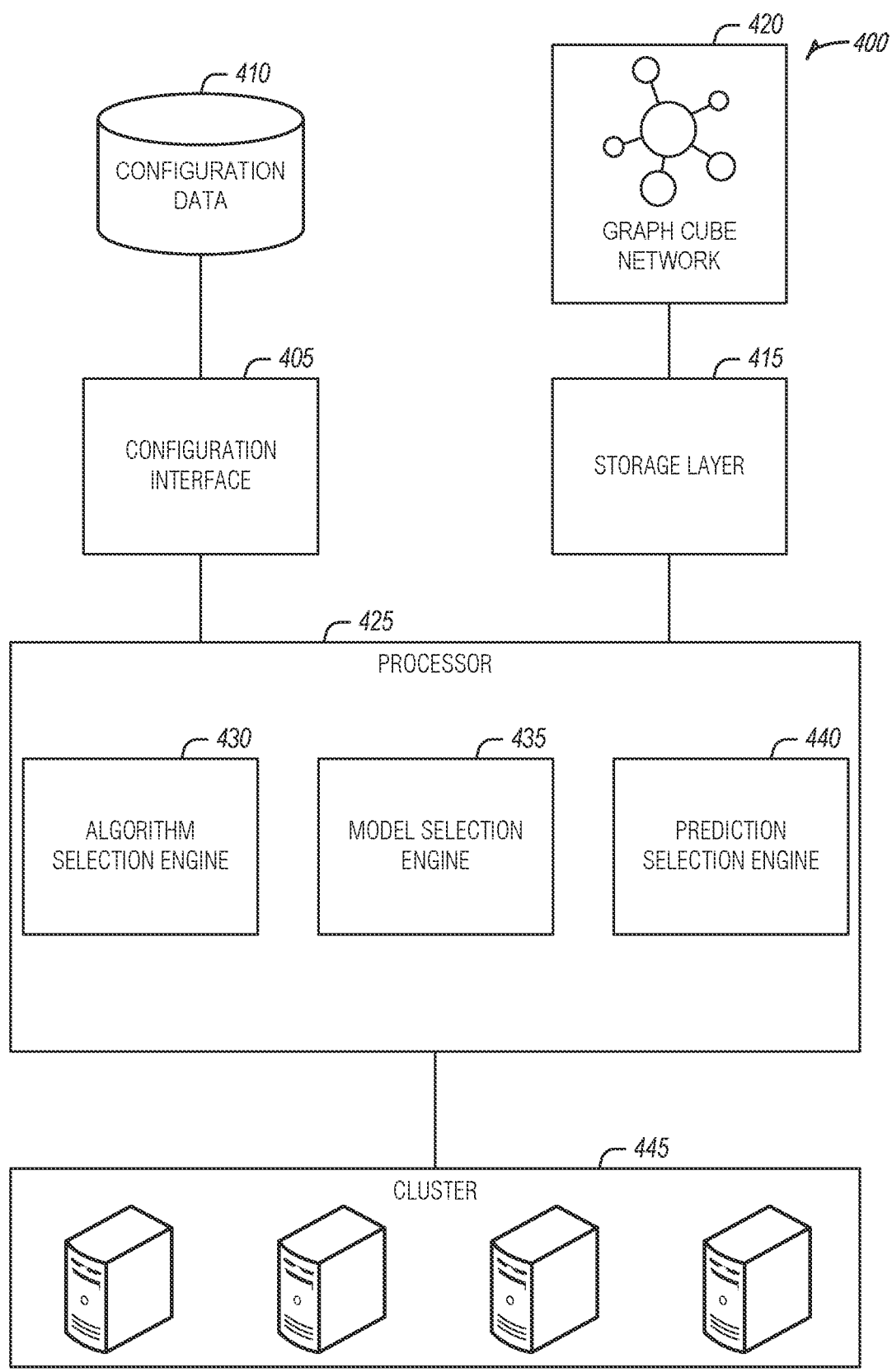
FIG. 4 illustrates a block diagram of an example of a system for hierarchical tournament-based machine learning predictions, according to an embodiment.

FIG. 4 illustrates a block diagram of an example of a system 400 for hierarchical tournament-based machine learning predictions, according to an embodiment. The system 400 may provide features as described in FIGS. 1, 2A, 2B, and 3.

The system 400 may include a configuration interface that receives configuration data 410, a storage layer 415 that contains data from a graph cube network 420, a processor 425 that includes an algorithm selection engine 430, a model selection engine 435, and a prediction engine 440. The processor 425 may distribute combinations for execution across a computing node cluster 445. The configuration data may include metrics (e.g., error rate, accuracy, precision, result return time, etc.) to be evaluated in a tournament to select a combination of an algorithm and model at a particular level for calculating a selected prediction. The configuration may be passed by the configuration interface 405 to the processor 425 and used to configure the processor 425 for evaluating the graph cube network data 420 stored in the storage layer 415. The configuration interface 405 may include a graphical user interface for input of configuration data or may include an application programmer interface (API) for programmatic input of configuration data by components of a logistics system.

As noted previously, the graph cube network 420 may include a variety of nodes and edges that represent logistical components within a supply chain. The storage layer 415 may include data that describes current and historical states of the graph cube network and relationships contained therein. A configuration is transmitted to the processor from the configuration interface 405 to the processor 425. The processor 425 may select combinations of algorithms, models, and predictions to enter into a tournament(s) to select a winning combination. The processor may select the entrant combinations based on an evaluation of various combinations to predict a probability that a given combination may calculate a result that will meet a metric provided in the configuration.

When the entrants have been determined, the processor 425 may retrieve data to be evaluated from the storage layer 425 to be passed to the cluster 445 when executing the combinations. The processor 425 may work in conjunction with the algorithm selection engine 430 to select an algorithm to be used in a given combination. The algorithm selection may be based in part on how the algorithm has performed in past evaluations based on feedback received from output derived using the algorithm. The processor 425 may work in conjunction with the model selection engine 435 to select a model for a given combination. The selection of the model may be based in part on how the model has performed in making past predictions. The processor 425 may work in conjunction with the prediction selection engine 440 to select a prediction for a given combination. In an example, the prediction may be based on configuration data included in the configuration received from the configuration interface 405. In another example, several predictions may produce similar outputs and various predictions may be selected in varying combinations to be included as entrants in the tournament. The predictions may be selected based in part on learned performance of the predictions by the processor 425. Algorithms, models, and predictions, by way of example and not limitation, are shown in FIG. 3.

The processor 425 may transmit the selected combinations for execution on the computing node cluster 445. The computing cluster 445 may execute the combinations serially or in parallel using the graph cube data retrieved from the storage layer 415 as input. The cluster 445 returns output prediction results to the processor 425 for evaluation. The processor 425 evaluates the output prediction results using the configuration including the designated performance metrics. The processor 425 may evaluate the output prediction results against each other (e.g., using clustering, etc.) to determine a winner or may evaluate the output prediction results against a predetermined baseline to predict a winner. The baseline evaluation method may be useful in validation of an existing selected model to reduce computing resource load. Evaluation of the output prediction results may be useful in establishing a baseline where no baseline exists or where the validity of an existing baseline may be in question.

The winning combination selected by the processor 425 may be stored in the storage layer 415 for use in performing future predictions for similar configurations. The processor 425 may conduct periodic tournaments in the future to validate that the selected combination remains the best available combination for the provided metrics and prediction. Additional tournaments may be triggered when changes (e.g., additions, deletions, modification, etc.) are detected to the available algorithms, models, and predictions. In an example, additional tournaments may be performed on a refresh schedule to periodically validate selected combinations so that the selections do not become stale (e.g., out of date, ineffective, etc.).

Figure 5:
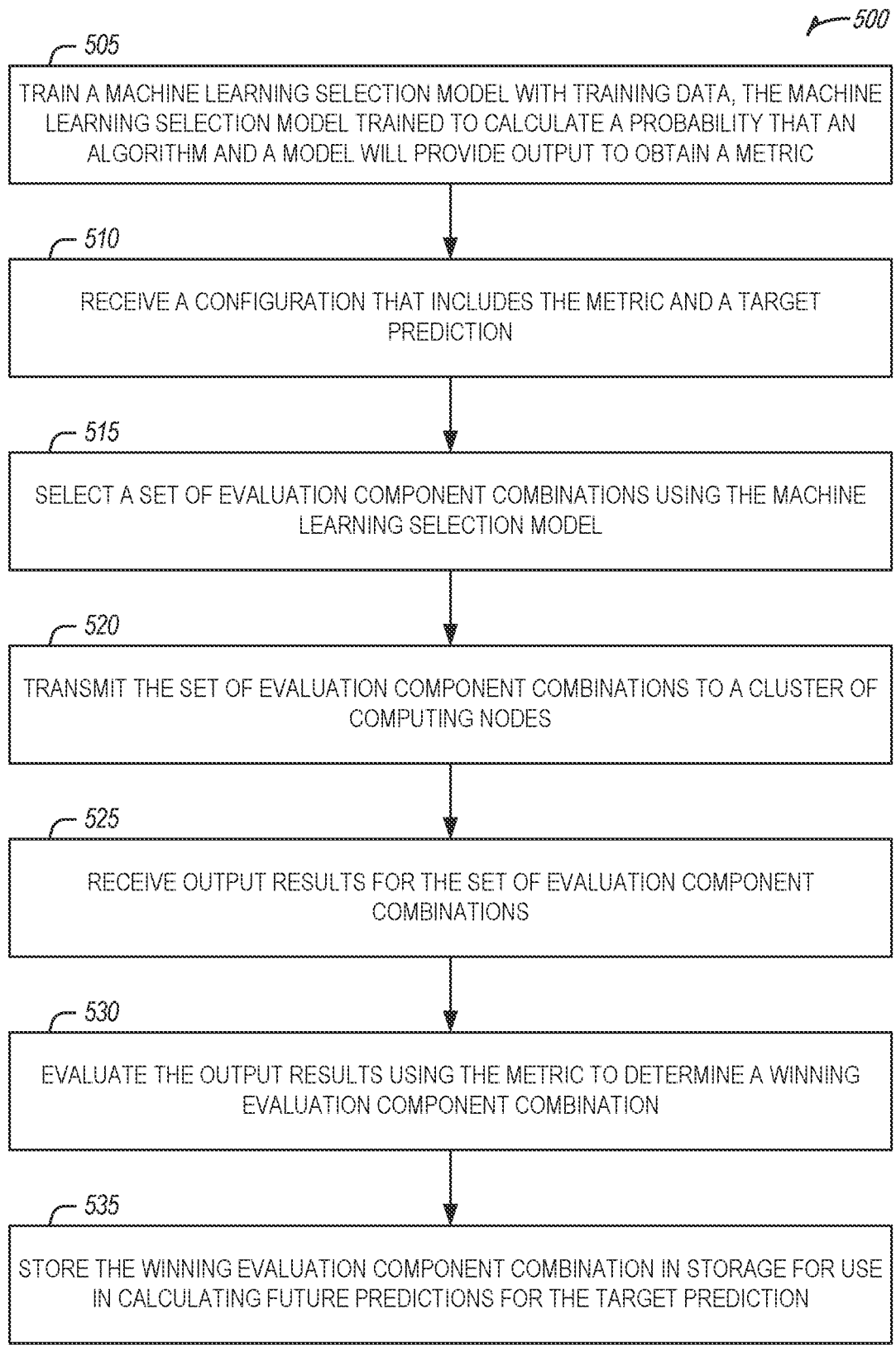
FIG. 5 illustrates a flow diagram of an example of a method for hierarchical tournament-based machine learning predictions, according to an embodiment.

FIG. 5 illustrates a flow diagram of an example of a method 500 for hierarchical tournament-based machine learning predictions, according to an embodiment. The method 500 may provide features as described in FIGS. 1, 2A, 2B, 3, and 4.

At operation 505, a machine learning selection model may be trained (e.g., by the processor 425 as described in FIG. 4, etc.) with training data. The machine learning selection model may be trained to calculate a probability that an algorithm and a model will provide output to obtain a metric.

At operation 510, a configuration may be received (e.g., by the processor 425 from the configuration interface 405 as described in FIG. 4, etc.) that includes the metric and a target prediction. In an example, the metric may be an error rate.

At operation 515, a set of evaluation component combinations may be selected (e.g., by the processor 425 as described in FIG. 4, etc.) using the machine learning selection model. Each evaluation component combination of the set of evaluation component combinations may include an algorithm (e.g., as selected by the algorithm selection engine 430 as described in FIG. 4, etc.), a hierarchical learning model corresponding to a level of a hierarchy (e.g., as selected by the model selection engine 435 as described in FIG. 4, etc.), and a prediction model for the target prediction (e.g., selected by the prediction selection engine 440 as described in FIG. 4, etc.). In an example, the machine learning selection model may select the algorithm from a set of algorithms. Each algorithm of the set of algorithms may include logic for performing prediction calculations using the hierarchical learning model and the prediction model. In an example, the hierarchical learning model may be selected from a graph cube network. The hierarchy may be at least a portion of the graph cube network. In an example, the prediction model may be selected from a graph cube network. The hierarchy may be at least a portion of the graph cube network.

At operation 520, the set of evaluation component combinations may be transmitted to a cluster of computing nodes. At operation 525, output results may be received for the set of evaluation component combinations.

At operation 530, the output results may be evaluated using the metric to determine a winning evaluation component combination. In an example, the output results may be compared to a baseline value for the metric and the winning evaluation component combination may be determined based on an output result of the winning evaluation component combination having the largest positive deviation from the baseline value. In another example, the output results may be evaluated using a machine learning algorithm to determine a fit between the metric and each output result of the output results and the winning evaluation component combination may be determined based on an output result of the winning evaluation component having the closest fit with the metric. At operation 535, the winning evaluation component combination may be stored in storage for use in calculating future predictions for the target prediction.

Figure 6:
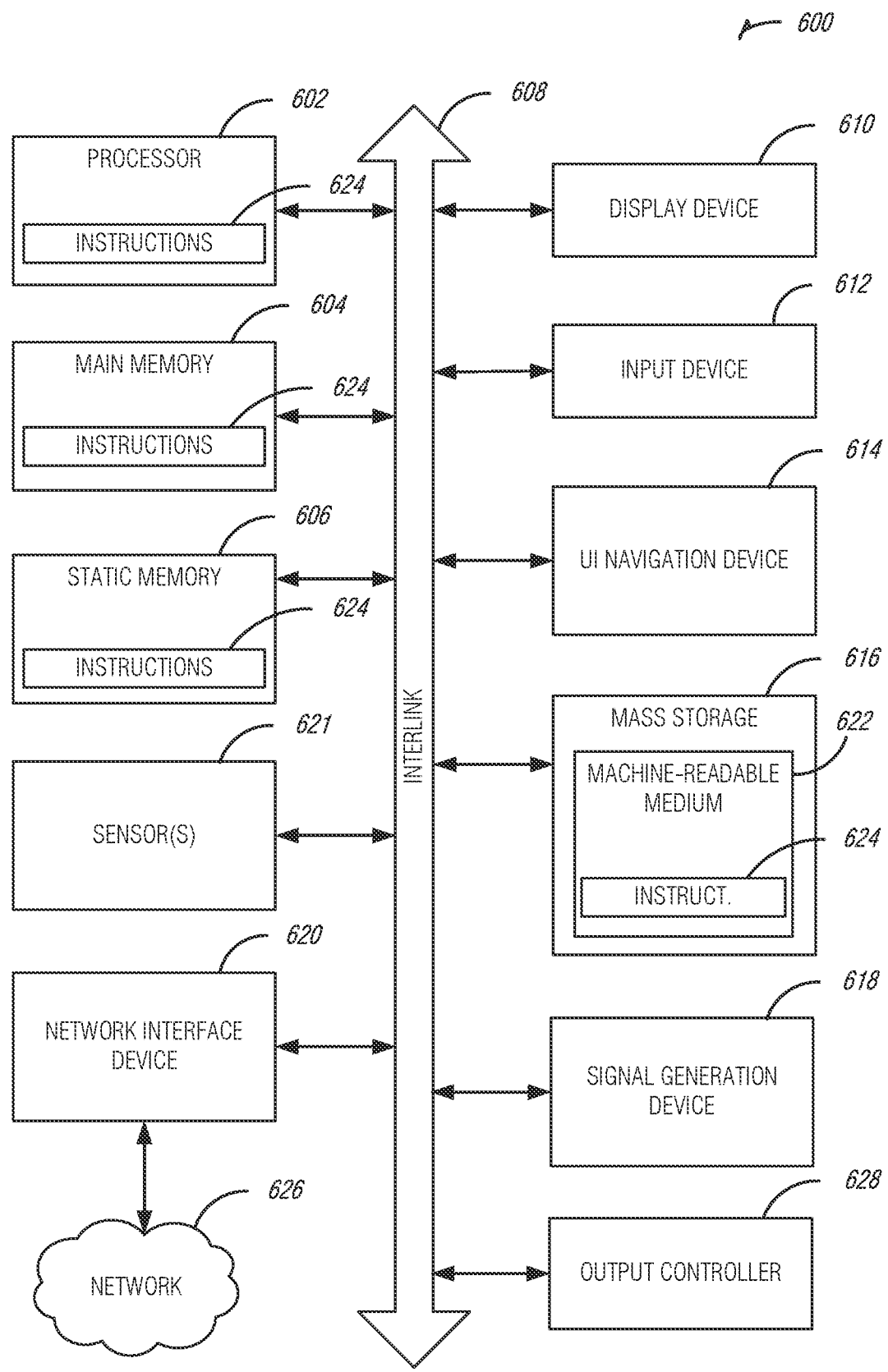
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for hierarchical tournament-based machine learning predictions comprising:
    at least one processor: and
    memory including instructions that, when executed by the at least one processor, cause the at least one processor to perform operations to:
        train a machine learning selection model with training data, the machine learning selection model trained to calculate a probability that an algorithm and a model will provide output to obtain a metric;
        receive a configuration that includes the metric and a target prediction;
        select a set of evaluation component combinations using the machine learning selection model, wherein each evaluation component combination of the set of evaluation component combinations includes an algorithm, a hierarchical learning model corresponding to a level of a hierarchy, and a prediction model for the target prediction;
        transmit the set of evaluation component combinations to a cluster of computing nodes;
        receive output results for the set of evaluation component combinations;
        evaluate the output results using the metric to determine a winning evaluation component combination; and
        store the winning evaluation component combination in storage for use in calculating future predictions for the target prediction.

2. The system of claim 1, wherein the machine learning selection model selects the algorithm from a set of algorithms, wherein each algorithm of the set of algorithms include logic for performing prediction calculations using the hierarchical learning model and the prediction model.

3. The system of claim 1, wherein the hierarchical learning model is selected from a graph cube network, and wherein the hierarchy is at least a portion of the graph cube network.

4. The system of claim 1, wherein the prediction model is selected from a graph cube network, and wherein the hierarchy is at least a portion of the graph cube network.

5. The system of claim 1, the instructions to evaluate the output results using the metric to determine a winning evaluation component combination further including instructions that, when executed by the at least one processor, cause the at least one processor to perform operations to:
compare the output results to a baseline value for the metric; and
determine the winning evaluation component combination based on an output result of the winning evaluation component combination having the largest positive deviation from the baseline value.

6. The system of claim 1, the instructions to evaluate the output results using the metric to determine a winning evaluation component combination further including instructions that, when executed by the at least one processor, cause the at least one processor to perform operations to:
evaluate the output results using a machine learning algorithm to determine a fit between the metric and each output result of the output results; and
determine the winning evaluation component combination based on an output result of the winning evaluation component having the closest fit with the metric.

7. The system of claim 1, wherein the metric is an error rate.

8. At least one non-transitory machine-readable medium including instructions for hierarchical tournament-based machine learning predictions that, when executed by at least one processor, cause the at least one processor to perform operations to:
train a machine learning selection model with training data, the machine learning selection model trained to calculate a probability that an algorithm and a model will provide output to obtain a metric;
receive a configuration that includes the metric and a target prediction;
select a set of evaluation component combinations using the machine learning selection model, wherein each evaluation component combination of the set of evaluation component combinations includes an algorithm, a hierarchical learning model corresponding to a level of a hierarchy, and a prediction model for the target prediction;
transmit the set of evaluation component combinations to a cluster of computing nodes;
receive output results for the set of evaluation component combinations;
evaluate the output results using the metric to determine a winning evaluation component combination; and
store the winning evaluation component combination in storage for use in calculating future predictions for the target prediction.

9. The at least one non-transitory machine-readable medium of claim 8, wherein the machine learning selection model selects the algorithm from a set of algorithms, wherein each algorithm of the set of algorithms include logic for performing prediction calculations using the hierarchical learning model and the prediction model.

10. The at least one non-transitory machine-readable medium of claim 8, wherein the hierarchical learning model is selected from a graph cube network, and wherein the hierarchy is at least a portion of the graph cube network.

11. The at least one non-transitory machine-readable medium of claim 8, wherein the prediction model is selected from a graph cube network, and wherein the hierarchy is at least a portion of the graph cube network.

12. The at least one non-transitory machine-readable medium of claim 8, the instructions to evaluate the output results using the metric to determine a winning evaluation component combination further including instructions that, when executed by the at least one processor, cause the at least one processor to perform operations to:
compare the output results to a baseline value for the metric; and
determine the winning evaluation component combination based on an output result of the winning evaluation component combination having the largest positive deviation from the baseline value.

13. The at least one non-transitory machine-readable medium of claim 8, the instructions to evaluate the output results using the metric to determine a winning evaluation component combination further including instructions that, when executed by the at least one processor, cause the at least one processor to perform operations to:
evaluate the output results using a machine learning algorithm to determine a fit between the metric and each output result of the output results; and
determine the winning evaluation component combination based on an output result of the winning evaluation component having the closest fit with the metric.

14. The at least one non-transitory machine-readable medium of claim 8, wherein the metric is an error rate.

15. A method for hierarchical tournament-based machine learning predictions comprising:
training a machine learning selection model with training data, the machine learning selection model trained to calculate a probability that an algorithm and a model will provide output to obtain a metric;
receiving a configuration that includes the metric and a target prediction;
selecting a set of evaluation component combinations using the machine learning selection model, wherein each evaluation component combination of the set of evaluation component combinations includes an algorithm, a hierarchical learning model corresponding to a level of a hierarchy, and a prediction model for the target prediction;
transmitting the set of evaluation component combinations to a cluster of computing nodes;
receiving output results for the set of evaluation component combinations;
evaluating the output results using the metric to determine a winning evaluation component combination; and
storing the winning evaluation component combination in storage for use in calculating future predictions for the target prediction.

16. The method of claim 15, wherein the machine learning selection model selects the algorithm from a set of algorithms, wherein each algorithm of the set of algorithms include logic for performing prediction calculations using the hierarchical learning model and the prediction model.

17. The method of claim 15, wherein the hierarchical learning model is selected from a graph cube network, and wherein the hierarchy is at least a portion of the graph cube network.

18. The method of claim 15, wherein the prediction model is selected from a graph cube network, and wherein the hierarchy is at least a portion of the graph cube network.

19. The method of claim 15, wherein evaluating the output results using the metric to determine a winning evaluation component combination further comprises:
   comparing the output results to a baseline value for the metric; and
   determining the winning evaluation component combination based on an output result of the winning evaluation component combination having the largest positive deviation from the baseline value.

20. The method of claim 15, wherein evaluating the output results using the metric to determine a winning evaluation component combination further comprises:
   evaluating the output results using a machine learning algorithm to determine a fit between the metric and each output result of the output results; and
   determining the winning evaluation component combination based on an output result of the winning evaluation component having the closest fit with the metric.

21. The method of claim 15, wherein the metric is an error rate.

* * * * *